E. R. BEEMAN & T. BRENNAN, Jr.
FLANGED DOUBLE DISK ATTACHMENT.
APPLICATION FILED OCT. 9, 1914.
1,177,567.
Patented Mar. 28, 1916.
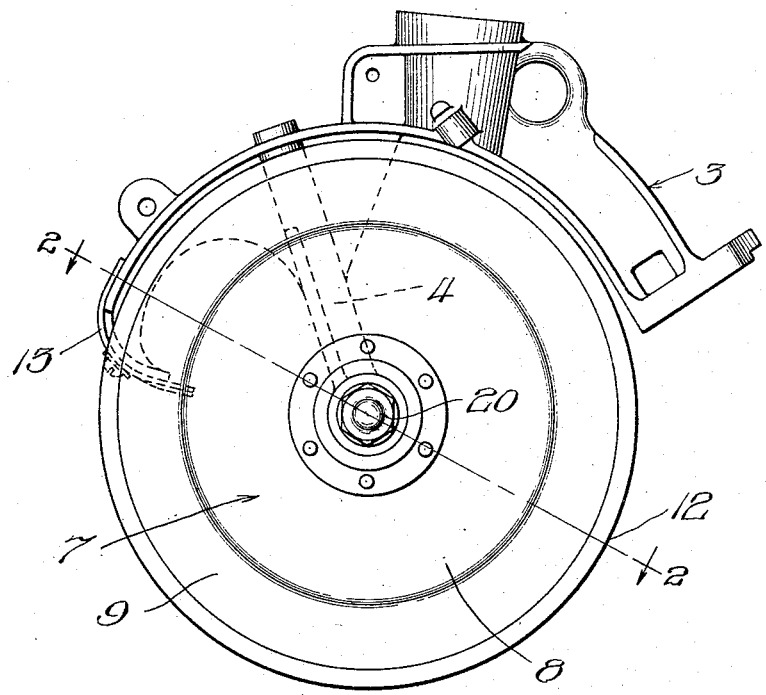
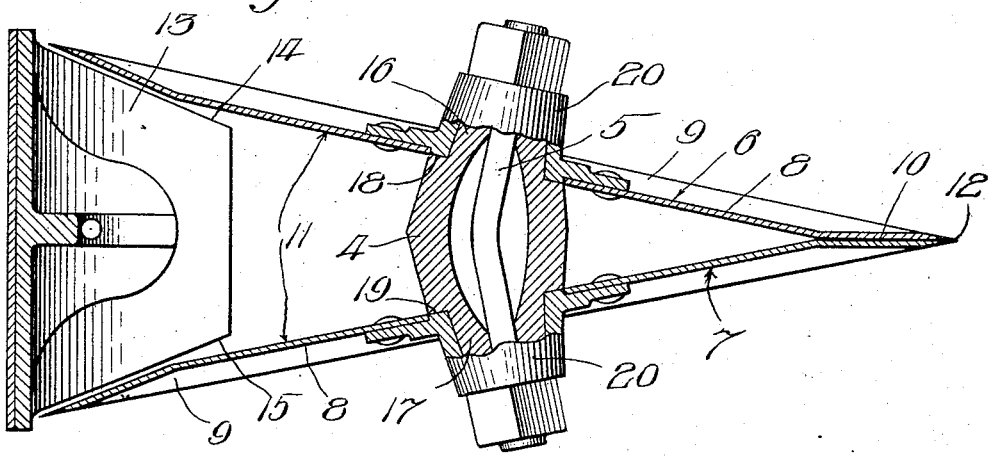
Witnesses:
Harry S. Gaither
Wm. P. Bond
Inventors
Edwin R. Beeman
Thomas Brennan Jr.
by Banning & Banning
Attys.
THE COLUMBIA PLANOGRAPH CO., WASHINGTON, D. C.

UNITED STATES PATENT OFFICE.

EDWIN R. BEEMAN AND THOMAS BRENNAN, JR., OF ST. LOUIS PARK, MINNESOTA, ASSIGNORS TO MONITOR DRILL COMPANY, OF MINNEAPOLIS, MINNESOTA, A CORPORATION OF MINNESOTA.

FLANGED DOUBLE-DISK ATTACHMENT.

1,177,567.   Specification of Letters Patent.   Patented Mar. 28, 1916.

Application filed October 9, 1914. Serial No. 865,908.

*To all whom it may concern:*

Be it known that we, EDWIN R. BEEMAN and THOMAS BRENNAN, Jr., both citizens of the United States, residing at St. Louis Park, Hennepin county, Minnesota, have invented certain new and useful Improvements in Flanged Double-Disk Attachments, of which the following is a specification.

The present invention has reference particularly to the shape of the disk itself and to the combination of a pair of specially shaped disks so as to provide a double disk attachment. The disks which are herein disclosed are peculiarly shaped so that when they are placed together in a double disk attachment they coöperate with each other in such a manner as to produce an implement having certain important advantages over implements formed from disks of the shape which is customary.

In order that the attachment may easily open comparatively hard ground, the forward or cutting portions of the disks should come together on a very acute angle, and in order to secure the best results the forward edges should lie tangent to each other so that together they virtually constitute a single cutting edge at their point of contact. Flat disks cannot accomplish this result, because the angle between the planes of the disks at their point of contact is of necessity the same as the angle between the planes of the disks at all remaining points.

Concavo-convex disks can be set together with their convex surfaces facing each other and their concave surfaces facing the sides of the furrow. However, when a pair of concavo-convex disks are thus set together with their surfaces lying tangent to each other at the point of contact it will be found that their rear edges are spread or expanded so far apart that the implement will not operate properly, and, furthermore, it will be found that the surfaces of the rear portions of the disks lie so nearly at right angles to the line of draft that the drag on the implement is undesirably large.

The main object of the present invention is to so form the disks that their forward edges can be brought together to constitute virtually a single cutting edge without the disadvantages which are presented in the use of concavo-convex disks for this purpose.

Other objects and uses will appear from a detailed description of the invention, which consists in the features of construction and combinations of parts hereinafter described and claimed.

In the drawing—Figure 1 shows a side elevation of a double disk attachment employing disks of the peculiar contour which is herein disclosed; and Fig. 2 shows a section taken on the line 2—2 of Fig. 1 looking in the direction of the arrows, and discloses particularly the peculiar cross-sectional form of the disks.

Referring to the figures, the frame 3 of the implement may be of the usual form, the same being provided with a downwardly depending boot 4. This boot in turn is provided with the customary axle 5, the end portions of which support the bearings for the disks 6 and 7. These disks are pan-shaped as distinguished from being plane or concavo-convex, which are the forms generally in use at the present time. The central portion 8 of each disk is flat, but is surrounded by a flanged portion 9 which lies at such an angle to the portion 8 that when the two disks are set together with their flanged portions squarely in contact at the point 10, which is the cutting point of the implement, there will be provided an angle 11 between the flat portions of the disks, as is best shown in Fig. 2. The size or amount of this angle will depend upon the angle at which each of the flanged portions of the disks is formed, assuming, of course, that the flanged portions lie flat together as shown at 10 in Fig. 2. The edges 12 of the disks are preferably sharpened so that the cutting point will be extremely sharp for the purpose of cutting hard or stiff soil.

The customary form of inside scraper 13 may be provided between the rear portions of the disks, but it will be noted that this scraper has its edges 14 and 15 formed at such angles that they lie against the flanged portions of the disks, which angles are different from the angles at which the central flat portions of the disks are placed.

In use, the edges 12 commence the cutting operation substantially at the point of contact 10 between the flanged peripheral portions of the disks. The amount of spread which it is necessary to impart to the soil is substantially measured by twice the thickness of the metal from which the disks are formed, until the implement has advanced to the point where the flattened central portions of the disks commence the spreading action. It therefore follows that the first portion of the cutting operation is accomplished by shearing the soil with a thickness of metal substantially measured by twice the thickness of the disk, and it therefore follows that the implement will very easily open up the soil even though the latter be very firmly compacted. Thereafter the flat central portions of the disks will come into action and spread the soil, and the amount of this spread will be substantially measured by the distance apart of the rear portions of the flat centers of the disks. The rear flanged portions of the disks will thereafter complete the spreading action and deposit the soil to the sides of the furrow, thereby ridging the ground at the sides of the furrow and between the successive furrows.

It will also be noted that a decrease or reduction in the diameters of the disks, either by wear or grinding, will not change or modify the positions of the central portions of the disks, for the reason that the flange portions lie in contact with each other throughout a distance equal to the radial width of such flange portions. That is to say, the radius of the disks might be reduced a distance substantially equal to the length of the portion 10 in Fig. 2 without the central portions 8 approaching each other any closer than they were originally. It therefore follows that it is unnecessary to provide a special form of bearing to take up or compensate for the positions of the disks as they wear or are reduced in diameter, thereby greatly simplifying the construction. For example, in the arrangement illustrated, the lower portion of the boot 4 carries the bearings 16 and 17, which are shouldered at the portions 18 and 19. Each disk in turn is provided with a hub 20 which rotates on the bearing and seats against the shoulder, so that the central portions of the disks are very firmly supported and without the necessity of providing any spring-pressed bearings or the like for forcing the disks toward each other.

In the use of the ordinary form of disk the peripheries of the disks come into contact at only a single point and they spread away from each other measured backward from this point of contact. Consequently there is an opening between the disks both above and below this point of contact, into which openings dirt and other trash readily find access. The consequence is that the space between the disks readily becomes clogged and obstructed so that the implement will not operate with entire satisfaction. On the other hand, by the use of flanged disks, such as those herein disclosed, the contact is established between them in such a way that the front edge of the angle between the disks is closed both above and below the line of contact for a considerable distance. For this reason dirt and trash cannot work in between the disks to anywhere near the extent that they can work between the disks of ordinary form and construction. This is an important point for the reason that it not only improves the operation of the disks but also relieves the inside scraper from a large portion of the burden which would otherwise be thrown upon it.

While we have herein shown and described only a single form of construction, still it will be evident that we contemplate other equivalent constructions except as may be specifically limited in the claim.

We claim:

In a disk implement, the combination of a pair of circular disks having their peripheral portions flanged outwardly away from each other, the flanged peripheral portion of each disk lying substantially in the surface of the truncated cone, and means for supporting said disks to permit rotation of them, said supporting means maintaining the flanged portions of the disks in contact with each other on a line lying more than 45° forwardly of a vertical line drawn through the center of rotation.

EDWIN R. BEEMAN.
THOMAS BRENNAN, Jr.

Witnesses:
GEORGE F. MOSELEY,
CLARENCE JOHNSON.

Copies of this patent may be obtained for five cents each, by addressing the "Commissioner of Patents, Washington, D. C."